United States Patent [19]

Lauth et al.

[11] Patent Number: 5,360,474
[45] Date of Patent: Nov. 1, 1994

[54] COLORED CRYSTALLINE ALUMINOPHOSPHATES AND/OR SILICOALUMINOPHOSPHATES OF THE AEL OR VFI TYPE

[75] Inventors: Guenter Lauth, Grosskarlbach; Ulrich Mueller, Neustadt; Wolfgang Hoelderich, Frankenthal; Stefan Brode, Karlsruhe; Gerhard Wagenblast, Weisenheim, all of Germany

[73] Assignee: BASF Aktiengesellschaft, Ludwigshafen, Germany

[21] Appl. No.: 946,406

[22] Filed: Sep. 16, 1992

[30] Foreign Application Priority Data

Sep. 21, 1991 [DE] Germany ............... 4131447

[51] Int. Cl.$^5$ .............. C09B 67/08; B01J 31/26; C01B 25/36; C08K 5/08
[52] U.S. Cl. .................. 106/402; 106/487; 106/491; 106/471; 106/467; 106/493; 502/214; 502/208; 502/155; 423/305
[58] Field of Search ............. 502/214, 208, 155; 423/305, 718, 702, DIG. 30; 106/487, 491, 471, 467, 493, 402

[56] References Cited

U.S. PATENT DOCUMENTS

| | | | |
|---|---|---|---|
| 3,946,134 | 3/1976 | Sherman | 106/309 X |
| 4,084,983 | 4/1978 | Bernhard et al. | 106/402 |
| 4,110,492 | 8/1978 | Hayman | 106/401 X |
| 4,310,440 | 1/1982 | Wilson et al. | 502/208 |
| 4,440,871 | 4/1984 | Lok et al. | 502/214 |
| 4,874,899 | 10/1989 | Hoelderich et al. | 568/386 |
| 5,132,437 | 7/1992 | Aslam et al. | 585/466 X |

FOREIGN PATENT DOCUMENTS 0130740 1/1985 European Pat. Off. .

OTHER PUBLICATIONS

S. D. Cox et al., Chemistry of Materials, vol. 2, Nr. 5 (1990), pp. 609-619.

*Primary Examiner*—Paul Lieberman
*Assistant Examiner*—Douglas McGinty
*Attorney, Agent, or Firm*—John H. Shurtleff

[57] ABSTRACT

Colored crystalline alumophosphates and/or silicoalumophsophates of the AEL or VFI type useful as dyes, optical elements and as adsorbents have the following X-ray diffraction diagram:

| Interplanar spacing d(A) | Relative intensity $I/I_o \times 100$ |
|---|---|
| 10.91 ± 0.1 | 26 ± 10 |
| 9.19 ± 0.1 | 41 ± 10 |
| 6.79 ± 0.05 | 16 ± 10 |
| 5.57 ± 0.05 | 52 ± 10 |
| 4.39 ± 0.05 | 39 ± 10 |
| 4.18 ± 0.05 | 71 ± 10 |
| 4.09 ± 0.05 | 33 ± 10 |
| 3.98 ± 0.05 | 57 ± 10 |
| 3.86 ± 0.05 | 68 ± 10 |
| 3.81 ± 0.05 | 100 | and a composition described by the following formula:

a quinizarin.b $Al_2O_3$.c $P_2O_5$.d $SiO_2$ where a is from 0.05 to 2, b and c are each from 8 to 12, and d is from 0 to 4.

6 Claims, 7 Drawing Sheets

COLORED CRYSTALLINE ALUMINOPHOSPHATES AND/OR SILICOALUMINOPHOSPHATES OF THE AEL OR VFI TYPE

The present invention relates to novel colored crystalline aluminophosphates and/or silicoaluminophosphates of the AEL or VFI type and processes for preparing and using same.

U.S. Pat. No. 4,310,440 discloses a multiplicity of microporous aluminophosphates (ALPOs). These are prepared by using as starting components not only phosphorus- and aluminum-containing compounds but also structure formers, or templates. Suitable templates include a multiplicity of organic nitrogen compounds (for example amines, ammonium compounds, nitrogen heterocycles). Depending on the nature of the template and on the reaction conditions it is possible to produce many different aluminophosphate structures, which are distinguished by their X-ray diffraction data.

Existing aluminophosphates differ in the structure of their void systems, i.e. in pore size, pore volume and surface area. These differences entail different properties, such as adsorption capacities, the ability to separate certain substances, or catalytic activity.

Aluminophosphates have a crystal lattice constructed of $TO_4$ tetrahedra with phosphorus and aluminum as tetrahedral atoms T. In general, the numbers of $AlO_4$ and $PO_4$ tetrahedra are identical, so that the crystal lattice carries no charge and therefore no charge-balancing cations are present either.

Microporous aluminophosphates find application as adsorbents and also as catalysts or catalyst carriers (review article: E. M. Flanigen at al., Structural, synthetic and physicochemical concepts in aluminophosphate-based molecular sieves, in Innovation in Zeolite Materials Science, P. J. Grobet et al. (eds.) Elsevier, 1988, pp. 13-27).

According to U.S. Pat. No. 4,440,871 it is possible to occlude silicon additionally into the crystal lattice of these aluminophosphates to arrive at silicoaluminophosphates (SAPOs).

SAPOs are synthesized similarly to ALPOs, the only difference being that a silicon source is added to the synthesis batch. The charges on the $AlO_4$, $PO_4$ and $SiO_4$ tetrahedra which make up the SAPO crystal lattice generally do not balance, resulting in a charged crystal lattice whose charge must be compensated by counterions.

For this reason SAPOs can be used not only for the purposes mentioned in connection with ALPOs but also as ion exchangers. Furthermore, in their H-form SAPOs are solid acids, and can accordingly be used for example as Brönsted acid catalysts.

The preparation of a microporous aluminophosphate designated as ALPO-11 is described in Examples 32 to 36 of U.S. Pat. No. 4,310,440. The compound is synthesized by using as starting components phosphoric acid, an aluminum compound and a dialkylamine, for example di-n-propylamine or diisopropylamine. The mixture is treated hydrothermally. The initial product is a microporous aluminophosphate whose pores are packed with the template. By calcining this compound it is possible to remove the template.

The preparation of a microporous silicoaluminophosphate designated SAPO-11 is described in Examples 15 to 22 of U.S. Pat. No. 4,440,871 and is similar to that of ALPO-11, except that a reactive silicon source is also added to the reaction batch.

ALPO-11 and SAPO-11 have the same structure, described for example by Bennett et al. (Zeolites 7 (1987), 160). The structure is classified as the AEL crystal structure in Meier and Olson, Atlas of Zeolite Structure Types, 2nd ed., Butterworths, London, 1987).

The aluminum phosphate VPI-5 is a molecular sieve having uniform one-dimensional channels and especially large pores of 18 T atoms and a free accessible diameter of about 12 A. The preparation of this substance is described for example in M. E. Davis et al. ACS Symp. Ser. 398 (1989), 291-304. Aqueous phosphoric acid is added to boehmite suspended in $H_2O$. The mixture is aged for 1.5-2 h and then n-dipropylamine is added with stirring. This reaction mixture is stirred at 142° C. for 20-24 h. The properties and characteristics of these materials are described for example in J. Phys. Chem. 95 (1991) 1380, Zeolites 11 (1991), 583, and J. Amer. Chem. Soc. 111 (1989), 3919. The Si-containing aluminum phosphate with a VPI-5 structure is likewise known and used for preparing the colorants of the invention.

The structure of VPI-5 is classified under the designation VFI.

The adsorption properties of ALPOs and SAPOs have hitherto not been greatly utilized. On occasion the adsorption of small molecules (water, nitrogen or even benzene) has been used for characterizing ALPOs and SAPOs. For example, the nature of the adsorbed molecule and the shape of the adsorption isotherms are used to gain information about the size and shape of micropores, pore volume, phase purity or presence of mesopores (review article by E. M. Flanigen et al., Aluminophosphate molecular sieves and the Periodic Table, Pure & Appl. Chem. 58 (1986), 1351-58).

Furthermore, the adsorption of volatile carbonyls in ALPO structures has been used to produce finely divided metal clusters in the micropores for catalytic purposes (R. F. How et al., Comparison of Zeolites and Aluminophosphates as Hosts for Transition Metal Complexes, in Catalysis Today 6 (1989), 113-122).

The selective adsorption properties of ALPOs are also used in EP-A-130 740 to separate ortho-substituted aromatics from an isomeric mixture.

The adsorption of organic molecules in ALPOs to produce colored compounds has only been described before by S. D. Cox et al., Chem. Mater. 2 (1990), 609. The molecules employed are nitrogen-containing compounds (nitro- and/or amino-substituted aromatics), i.e. compounds that are also used for example as templates. The compounds formed from ALPOs and colored nitrogen compounds have a pale yellow color; however, the color-conferring organic compounds are held only weakly in that they can be washed out of the micropores with chloroform or acetone.

Quinizarin, or 1,4-hydroxyanthraquinone, is a known anthraquinone dye with a bright red color. The synthesis and properties of this class of dyes is described in many textbooks of organic chemistry (H. Beyer, W. Walter, Lehrbuch der organischen Chemie, Hirtzel Verlag 1981, Chapter Anthrachinonfarbstoffe, pp. 604–606).

It is an object of the present invention to adsorb organic molecules firmly into an aluminophosphate and/or silicoaluminophosphate structure in order that novel dyes having improved properties, such as dyeing power, fastness or special optical properties, may be obtained.

We have found that this object is achieved by novel colored crystalline aluminophosphates and/or silicoaluminophosphates of the AEL type as per the following X-ray diffraction diagram:

| Interplanar spacing d(A) | Relative intensity $I/I_o \times 100$ |
| --- | --- |
| 10.91 ± 0.1 | 26 ± 10 |
| 9.19 ± 0.1 | 41 ± 10 |
| 6.79 ± 0.05 | 16 ± 10 |
| 5.57 ± 0.05 | 52 ± 10 |
| 4.39 ± 0.05 | 39 ± 10 |
| 4.18 ± 0.05 | 71 ± 10 |
| 4.09 ± 0.05 | 33 ± 10 |
| 3.98 ± 0.05 | 57 ± 10 |
| 3.86 ± 0.05 | 68 ± 10 |
| 3.81 ± 0.05 | 100 | with a composition described by the following formula:

$$a \text{ quinizarin} \cdot b \text{ Al}_2\text{O}_3 \cdot c \text{ P}_2\text{O}_5 \cdot d \text{ SiO}_2$$

where a is from 0.05 to 2, b and c are each from 8 to 12, and d is from 0 to 4.

It is surprising that quinizarin can be occluded into ALPO-11 and/or SAPO-11. Quinizarin is a molecule that contains no nitrogen and thus is not suitable for example for use as a template for ALPOs. Compared with any molecules previously adsorbed into ALPO-11 or SAPO-11, quinizarin is very large. Meier and Olson (Atlas of Zeolite Structure Types, 2nd ed., Butterworth, London, 1987) give the dimensions of the ALPO-11 void as 3.9×6.3 A). According to them, a molecule as large as quinizarin (dimensions derived from molecular models about 12×9×3.5 A) should not fit into the ALPO-11 pore.

It is surprisingly possible, then, to load the pores of ALPO-11 with quinizarin molecules by a suitable treatment of a quinizarin-ALPO-11 mixture.

Colored crystalline aluminophosphates and/or silicoaluminophosphates of the AEL type can be prepared as follows. A mixture of quinizarin and ALPO and/or SAPO, preferably ALPO-11 and SAPO-11, is heated under pressures of from 0.001 to 10 bar, preferably of from 0.01 to 2 bar, particularly preferably of from 0.05 to 1 bar, especially of from 0.1 to 0.5 bar, to 50°–300° C., preferably from 130° to 250° C., particularly preferably from 150°–200° C. The temperature is in general maintained for a period of from 10 seconds to 3 hours, in particular for from 1 to 100 minutes. Afterwards excess quinizarin can be removed by suitable treatment.

A further way of preparing the novel compound is to synthesize the quinizarin in situ from suitable starting materials, for example naphthoquinone and dihydroxybutadiene.

The synthesis is in general carried out in the presence of calcined ALPO-11 or SAPO-11 as a Dieis-Alder reaction between naphthoquinone and substituted butadiene, as a Friedel-Crafts reaction between phthalic anhydride and substituted benzene or by oxidation of substituted anthracene. The starting molecules must be chosen in such a way in terms of size that they are not larger than the pores of ALPO-11/SAPO-11 and hence fit into the channels of the molecular sieves in question. The reaction conditions for this synthesis must be chosen in such a way as to maintain a pH of from 4 to 10, preferably from 5.5 to 8, particularly preferably of from 6.5 to 7.5, in order that the structure of the molecular sieve may not be destroyed.

After the quinizarin has been synthesized inside the ALPO-11 or SAPO-11, excess starting material and quinizarin formed outside the pores are removed by suitable treatment, for example extraction with acetone or acetonitrile or by raising the temperature (removal by sublimation).

A further way of preparing the novel compound is to synthesize ALPO-11 or SAPO-11 in the presence quinizarin. A customary ALPO or SAPO synthesis mixture, comprising an aluminum, a phosphorus and optionally a silicon source, is treated with quinizarin and optionally a further template and the mixture is treated hydrothermally in an autoclave at from 100° to 250° C. The resulting product is filtered off and treated with suitable solvents, such as a) water (organic starting materials, phosphorus, aluminum and silicon compounds) and b) acetone or acetonitrile (excess quinizarin), to remove unconverted starting materials.

The novel colored crystalline aluminophosphates and/or silicoaluminophosphates of the AEL type according to the invention have a distinctly different color (violet) from the starting materials quinizarin (bright red) and ALPO-11 or SAPO-11 (white). The reflectance spectrum and the calculated K/S spectrum (K=absorption coefficient, S=scattering coefficient; calculation by the Kubelka-Munk equation: $K/S = (1-R)/(2R^2)$) of the novel substance (FIGS. 1 and 1a; curves B and B') are distinctly different from the corresponding spectra of a physical mixture of quinizarin and ALPO-11 (FIGS. 1 and 1a, curves A and A'). What is particularly evident from FIGS. 1 and 1a is the bathochromic shift of the spectra of the novel compound compared with the spectra of the physical mixture of quinizarin and ALPO-11.

The X-ray diffractogram of the novel compound shows the following lines:

| Interplanar spacing d(A) | Relative intensity $I/I_o \times 100$ |
| --- | --- |
| 10.91 ± 0.1 | 26 ± 10 |
| 9.19 ± 0.1 | 41 ± 10 |
| 6.79 ± 0.05 | 16 ± 10 |
| 5.57 ± 0.05 | 52 ± 10 |
| 4.39 ± 0.05 | 39 ± 10 |
| 4.18 ± 0.05 | 71 ± 10 |
| 4.09 ± 0.05 | 33 ± 10 |
| 3.98 ± 0.05 | 57 ± 10 |
| 3.86 ± 0.05 | 68 ± 10 |
| 3.81 ± 0.05 | 100 |

The X-ray diffractogram of the novel colored compound does not contain any diffraction lines of quinizarin. Compared with the diffractogram of pure ALPO-11 there are distinct differences, in particular in the intensity of the diffraction lines.

Colored crystalline aluminophosphates and/or silicoaluminophosphates of the VFI type are preparable by using the molecular sieve VPI-5 or Si-VPI-5 in the above-described syntheses instead of ALPO-11 or SAPO-11.

Chemical analysis of the novel colored crystalline aluminophosphates and/or silicoaluminophosphates of the AEL or VFI type reveals a composition described by the following formula:

a quinizarin.$b$ Al$_2$O$_3$.$c$ P$_2$O$_5$.$d$ SiO$_2$ where a is from 0.05 to 2, b and c are each from 8 to 12, and d is from 0 to 4.

The resistance of the novel dyes to organic solvents such as acetone, acetonitrile, methanol, ethanol or diethyl ether is much improved compared with quinizarin. Whereas quinizarin dissolves for example in hot ethanol, the color of the novel compound survives a Soxhlet extraction with ethanol for several days. Only occasionally is there even a trace of red color in the solvent.

Similarly, the thermal stability of the novel compound is distinctly better than that of quinizarin. Whereas pure quinizarin melts and becomes markedly volatile at only 200° C., the novel material remains solid to more than 400° C.; it is not until above 500° C. that the quinizarin occluded in the molecular sieve decomposes with oxidation. This is particularly clear from a thermogravimetric analysis of the novel compound compared with pure quinizarin (DTA curves; FIG. 2). A characteristic of the novel compound (curve B) is the exothermic weight loss at around 520° C., which corresponds to a decomposition of the quinizarin occluded in the pores of the molecular sieve. The weight loss at 150° C. in the same curve corresponds to the desorption of water. By contrast, the DTG curve of quinizarin (curve A) only shows a weight loss at 260° C. (sublimation).

The novel material is therefore employable as a temperature and solvent resistant dye and as a pigment with a specific hue. The storage of information through specific modification of the dye fixed within the molecular sieve is possible. Very slow release of quinizarin into a suitable solvent can be employed for the controlled metering of quinizarin. Because of the regular arrangement of the ALPO-11 or VPI-5 channels the quinizarin molecules must also be within a regular arrangement within the novel compound. This arrangement can cause a pronounced change in the linear and non linear optical properties (review article: D. J. Williams Angew. Chem. 96 (1984), 637–651), which makes the use of the material as an optical element a possibility. Photochemical and catalytic uses of the novel material are possible.

The invention is illustrated by the following Examples:

EXAMPLE 1

50 g of calcined ALPO-11 (prepared as described in Example 32 of U.S. Pat. No. 4,310,440) are mixed with 10 g of quinizarin. The mixture has a bright red color. It is heated in a vacuum to about 200° C. under a pressure of about 1 mbar. The compound formed has a deep violet color.

EXAMPLE 2

The violet compound of Example 1 is repeatedly washed with hot ethanol and then Soxhlet extracted with ethanol for 24 hours. Following the washes the color of the compound is an unchanged violet. The extractant has only a trace of red color.

The dried material contains 3.3% of carbon, 37.4% of Al$_2$O$_3$ and 52.1% of P$_2$O$_5$, corresponding to an empirical formula of $(0.5\pm0.1)$ quinizarin.$(10\pm1)$ Al$_2$O$_3$.$(10\pm1)$ P$_2$O$_5$.

The reflectance spectrum of the compound (FIG. 1, curve B) differs distinctly from the spectrum of a physical mixture of quinizarin and ALPO-11 (FIG. 1, curve A).

EXAMPLE 3

The violet compound of Example 1 is repeatedly washed with acetonitrile for 15 min at a time at about 70° C. Following the washes the color of the compound is an unchanged violet. The chemical composition and the reflectance spectrum correspond to those recited in Example 2.

EXAMPLE 4

50 g of calcined SAPO-11 (prepared as described in Example 15 of U.S. Pat. No. 4,440,871) are mixed with 10 g of quinizarin. The mixture has a bright red color. It is heated in a vacuum under a pressure of about 1 mbar to about 200° C. The compound formed has a deep violet color.

EXAMPLE 5

The violet compound of Example 4 is repeatedly washed with ethanol for 15 min at a time at about 70° C. Following the washes the color of the compound is an unchanged violet. The dried material contains 6.3% of carbon, 32.4% of Al$_2$O$_3$, 42.2% of P$_2$O$_5$ and 3.9% of SiO$_2$, which corresponds to an empirical formula of $(1\pm0.2)$ quinizarin.$(10\pm1)$ Al$_2$O$_3$.$(9\pm1)$ P$_2$O$_5$.$(2\pm0.4)$SiO$_2$.

EXAMPLE 6

The violet compound of Example 2 is heated to 350° C. This has no effect on the substance. There is no sign of any decomposition, for example elimination of quinizarin from the micropores, nor of a change in color.

EXAMPLE 7 (comparative)

50 g of calcined ALPO-11 are mixed with 10 g of quinizarin. The mixture has a bright red color. The reflectance spectrum of the mixture is very similar to that of pure quinizarin. The lines of quinizarin are distinctly visible in the diffraction diagram of the mixture.

EXAMPLE 8 (comparative)

The bright red mixture of Example 6 is repeatedly washed with ethanol for 15 min at a time at about 70° C. In the course of the washes the color of the mixture changes distinctly from red to a very bright pink. The material, now with a pale color, contains less than 1% of carbon.

BRIEF DESCRIPTION OF THE DRAWINGS

FIGS. 3, 4 and 5 are explained in the following Example 9, wherein FIG. 3 is an X-ray diffractogram, FIG. 4 is a reflective spectrum, and FIG. 5 is a thermogravimetric diagram.

EXAMPLE 9

50 g of dried VPI-5 are mixed with 10 g of quinizarin. The mixture has a bright red color. It is heated to about 200° C. in a vacuum of 1 mbar. The compound formed has a deep violet color.

The violet compound is repeatedly washed with hot ethanol and then Soxhlet extracted with ethanol for 24 hours. Following the washes the color of the compound is an unchanged violet.

The dried material contains 4.7% of carbon, 30.3% of $Al_2O_3$ and 40.4% of $P_2O_5$, which approximates to an empirical formula of 0.5 quinizarin.9 $Al_2O_3$.9$P_2O_5$.

Figure 1:
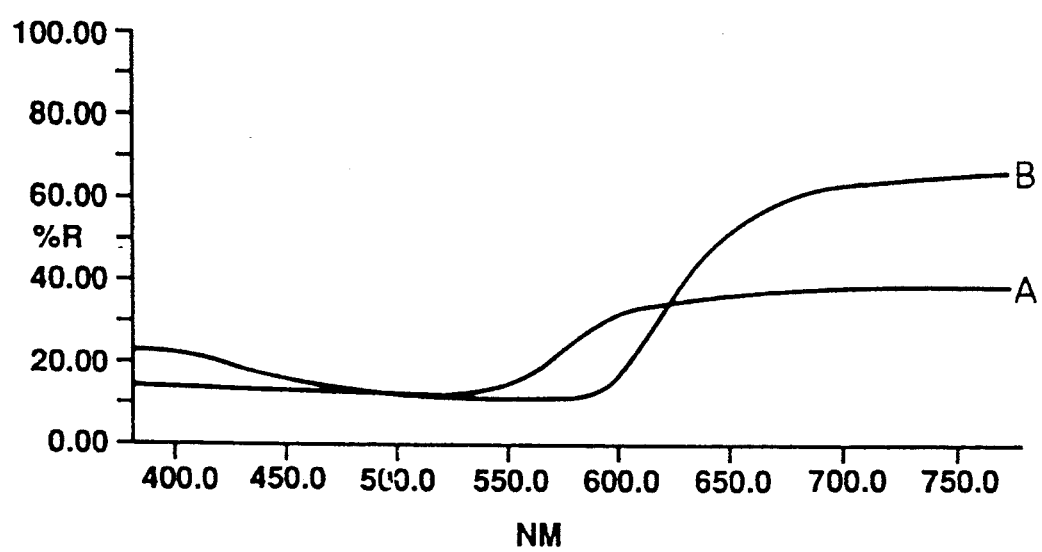
FIGS. 1 and 1a: reflectance spectra and calculated K/S spectra of a physical mixture of quinizarin and ALPO-11 (curves A and A') and of the novel occlusion compound comprising quinizarin in ALPO-11 (curves B and B')
Figure 1A:
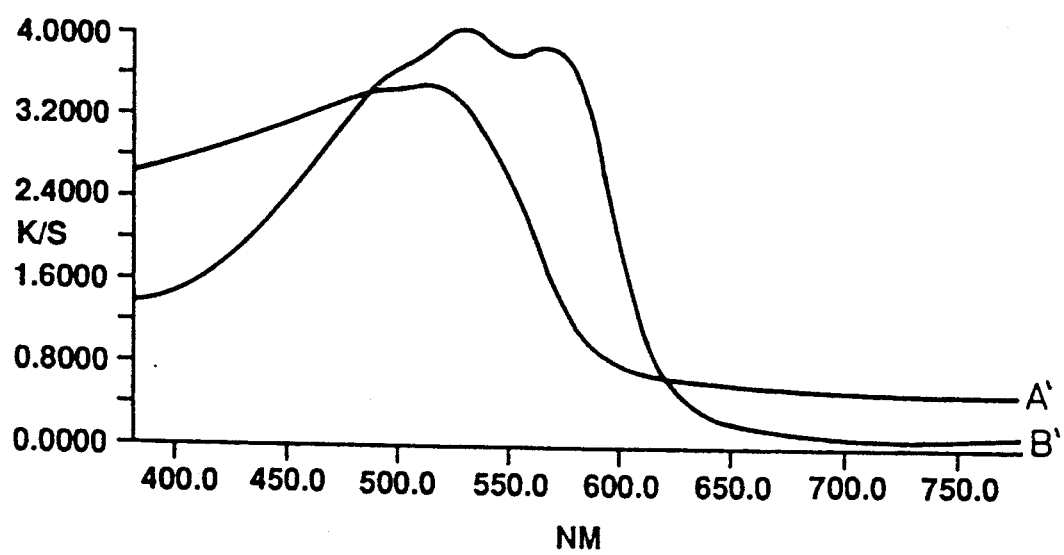
Figure 2:
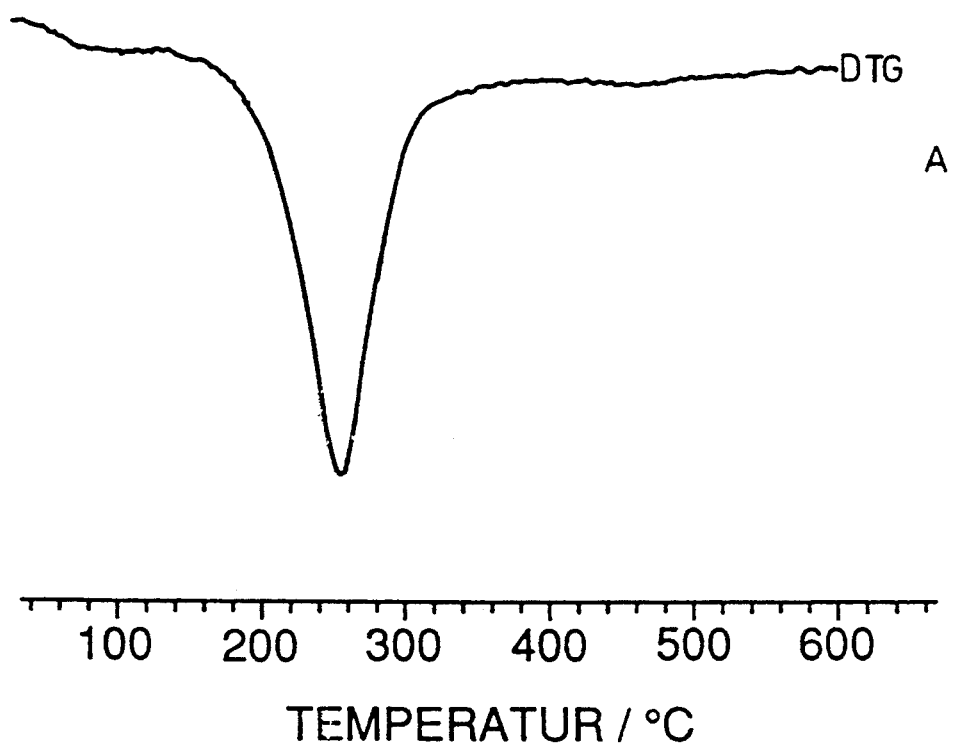
FIGS. 2 and 2a: thermogravimetric analysis (DTG curves) of pure quinizarin (curve A) and of the novel occlusion compound comprising quinizarin in ALPO-11 (curve B)
Figure 2A:
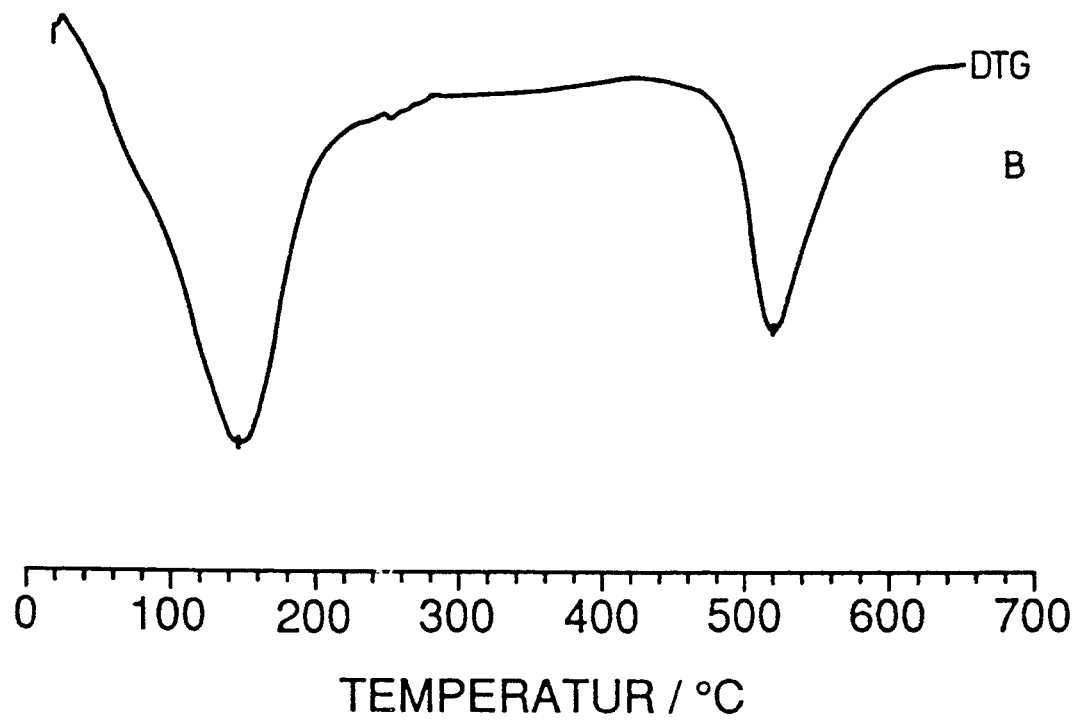
Figure 3:
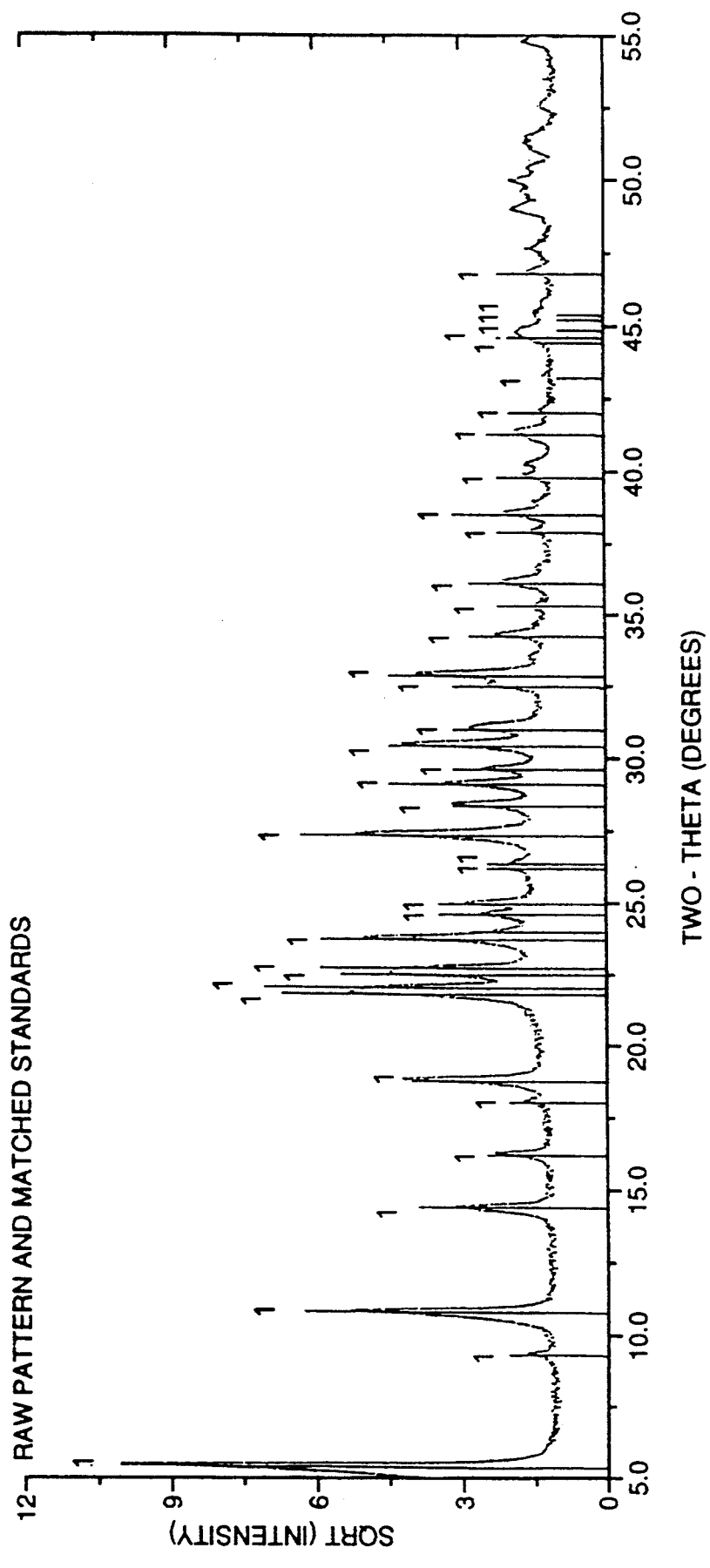

The X-ray diffractogram of the material shows only the diffraction lines of the molecular sieve VPI-5 (FIG. 3).

Figure 4:
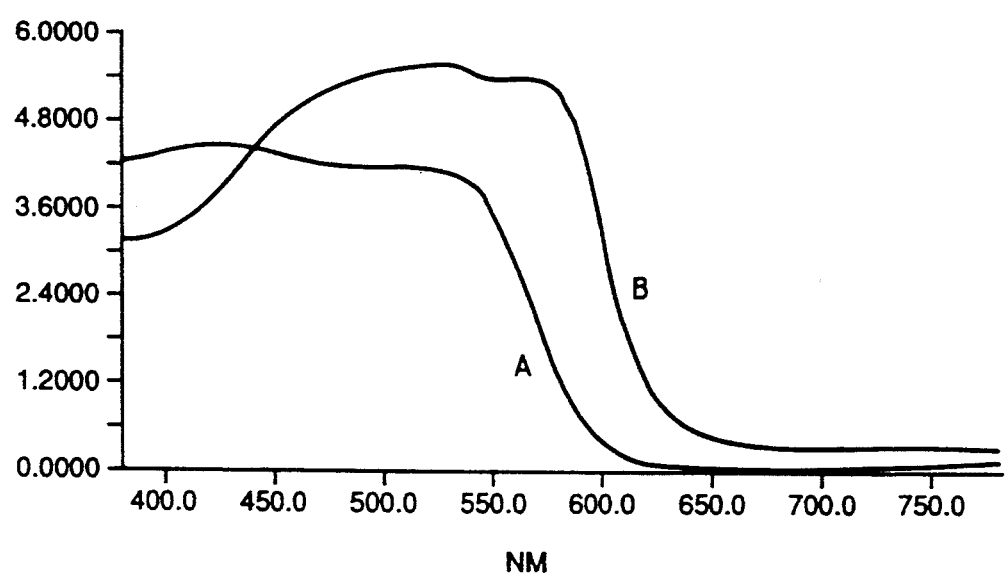

The reflectance spectrum of the compound differs not only from that of the pure VPI-5 but also from that of quinizarin; there is in particular a distinct bathochromic shift compared with pure quinizarin (FIG. 4).

Figure 5:
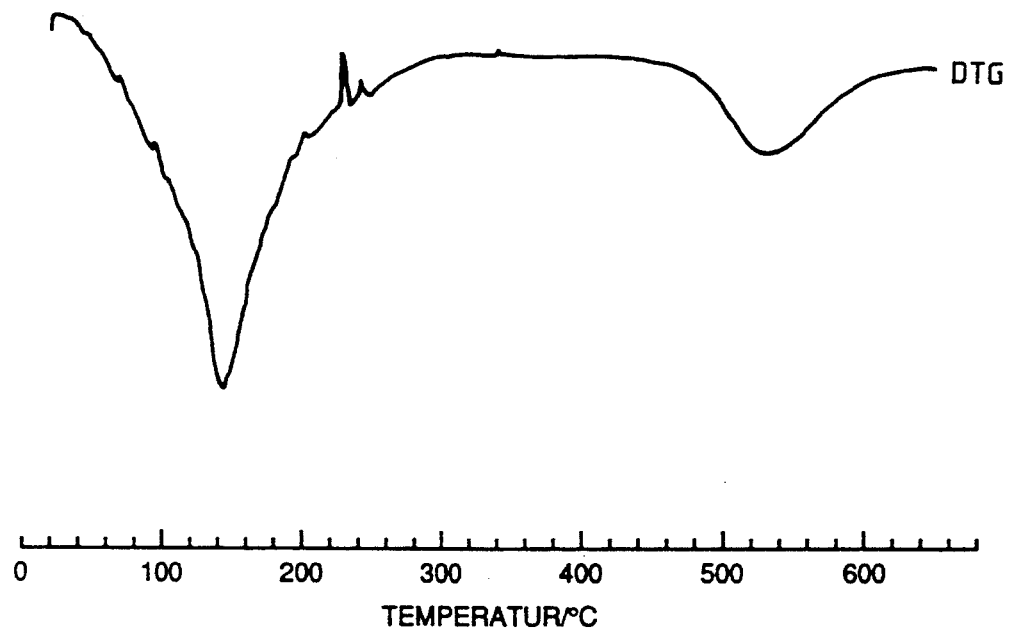

Thermogravimetry shows that the quinizarin bound in the molecular sieve does not undergo an exothermic decomposition until above 500° C. (FIG. 5).

We claim:

1. A colored crystalline material comprising a quinizarin dye occluded and loaded into the pores of at least one microporous crystalline structure selected from the group consisting of one or more aluminophosphates, one or more silicoaluminophosphates and combinations thereof wherein said aluminophosphates, silicoaluminophosphates and combinations thereof are of the AEL or VFI type, said material having a composition defined by the following formula:

a quinizarin.$b$ $Al_2O_3$.$c$ $P_2O_5$.$d$ $SiO_2$ where a is from 0.05 to 2, b and c are each from 8 to 12 and d is from 0 to 4.

2. The colored crystalline ALPO-11 aluminophosphate of the AEL type as claimed in claim 1 having the following X-ray diffraction diagram:

| Interplanar spacing d(A) | Relative intensity $I/I_o \times 100$ |
|---|---|
| 10.91 ± 0.1 | 26 ± 10 |
| 9.19 ± 0.1 | 41 ± 10 |
| 6.79 ± 0.05 | 16 ± 10 |
| 5.57 ± 0.05 | 52 ± 10 |
| 4.39 ± 0.05 | 39 ± 10 |
| 4.18 ± 0.05 | 71 ± 10 |
| 4.09 ± 0.05 | 33 ± 10 |
| 3.98 ± 0.05 | 57 ± 10 |
| 3.86 ± 0.05 | 68 ± 10 |
| 3.81 ± 0.05 | 100. |

3. A colored crystalline material as claimed in claim 1 which contains quinizarin occluded into a microporous ALPO-11 and has the empirical formula:

(0.5±0.1) quinizarin.(10±1) $Al_2O_3$.(10±1) $P_2O_5$.

4. A colored crystalline material as claimed in claim 1 which contains quinizarin occluded into a microporous SAPO-11 and has the empirical formula:

(1±0.2) quinizarin.(10±1) $Al_2O_3$.(9±1) $P_2O_5$.(2±0.4) $SiO_2$.

5. A colored crystalline material as claimed in claim 1 which contains quinizarin occluded into a microporous VPI-5 and has the empirical formula:

(0.5) quinizarin.9$Al_2O_3$.9$P_2O_5$.

6. A process for preparing a colored crystalline material comprising a quinizarin dye occluded and loaded into the pores of at least one microporous crystalline structure selected from the group consisting of one or more aluminophosphates, one or more silicoaluminophosphates and combinations thereof, wherein said aluminophosphates, silicoaluminophosphates and combinations thereof are of the AEL or VFI type, said material having a composition defined by the following formula:

a quinizarin.$b$ $Al_2O_3$.$c$ $P_2O_5$.$d$ $SiO_2$ where a is from 0.05 to 2, b and c are each from 8 to 12 and d is from 0 to 4, which process comprises:
mixing at least one or more members selected from the group consisting of aluminophosphates and one or more silicoaluminophosphates, all of which are of the AEL or VFI type, with quinazarin to form a mixture, and heating said mixture to a temperature of from 50° to 300° C.

* * * * *